Figure 1:
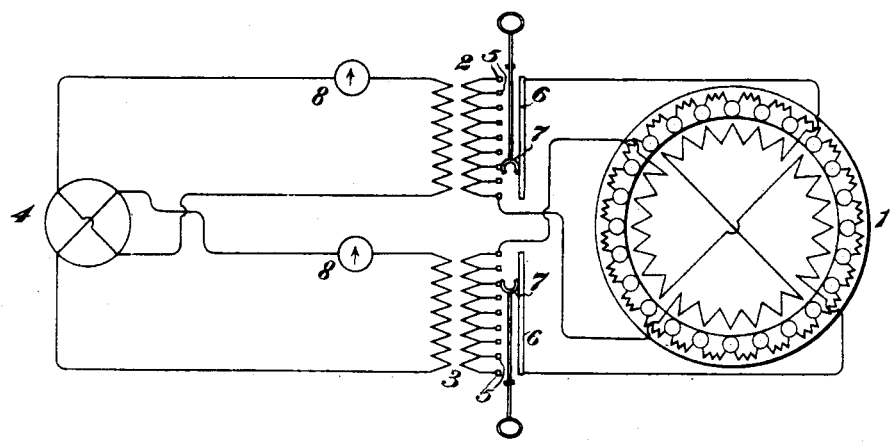

No. 609,990. Patented Aug. 30, 1898.
B. G. LAMME.
MEANS FOR CONTROLLING NON-SYNCHRONOUS ALTERNATING CURRENT MOTORS.
(Application filed Mar. 11, 1896.)
(No Model.)

WITNESSES:
Ethan I. Dodds
Hubert C. Tener

INVENTOR,
Benjamin G. Lamme
BY
Wesley G. Carr
ATTORNEY.

THE NORRIS PETERS CO., PHOTO-LITHO., WASHINGTON, D. C.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

MEANS FOR CONTROLLING NON-SYNCHRONOUS ALTERNATING-CURRENT MOTORS.

SPECIFICATION forming part of Letters Patent No. 609,990, dated August 30, 1898.

Application filed March 11, 1896. Serial No. 582,765. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Means for Controlling Non-Synchronous Alternating-Current Motors, (Case No. 686,) of which the following is a specification.

My invention relates to alternating-current electric motors of that class known as "induction-motors," in which the current is supplied to the primary member and the secondary member has closed-circuit windings in which current is induced by that supplied to the primary member.

The object of my invention is to provide a means whereby a variable speed and a large starting torque may be secured with induction-motors in which the magnetic leakage is small and the secondary members have high-resistance windings.

My invention is designed more particularly for motors operated by multiphase currents; but it may be employed in connection with single-phase motors under certain conditions.

It has been found in practice that an alternating-current motor of the non-synchronous type will tend to run at an approximately constant speed and that in order to secure an increase of torque with a drop in speed below such value the secondary member of the motor must have considerable resistance and a small amount of self-induction. If the resistance in the secondary is small and the self-induction large, the torque will be at a maximum when the motor is running at a comparatively high speed and will decrease with the decrease in speed from that point. If, however, the motor is so constructed that the magnetic leakage between the primary and secondary is very low and the resistance in the secondary is high, the maximum torque of the motor may be secured at zero speed. If the electromotive force applied to the primary of a motor of the character last above described be decreased, the maximum torque will be decreased in a greater degree, the law being that the maximum torque varies as the square of the electromotive force applied. The form of the curve representing the torque for the lower primary electromotive force is similar to that for the higher; but the drop in speed for a given torque is much greater. By varying the electromotive force applied to such a motor the speed may therefore be varied over a wide range. This variation of electromotive force may be obtained by any suitable means; but a convenient means for this purpose consists of transformers provided with variable ratios of transformation. This variation in the electromotive force supplied by the transformers may be secured by varying the effective lengths of either their primaries or their secondaries or by varying the relative position of the two. A variable resistance in the primary circuit is not satisfactory for the purpose of securing variations in electromotive force, for the reason that as the electromotive force applied to the motor is reduced the current for a given torque is increased. Consequently the watts supplied to the motor are approximately constant and the resistance in the circuit would involve a very considerable loss. As has already been stated, a motor suitable for giving satisfactory results in connection with the method of regulation above outlined is one in which the magnetic leakage between the primary and the secondary is very small and in which the resistance of the secondary circuit is comparatively very large.

Figure 2:
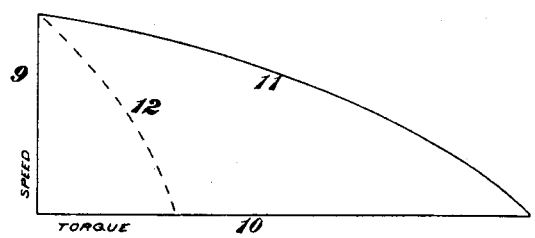

Figure 1 is a diagram illustrative of my invention in which hand-operated means for varying the voltage supplied to the primary member of the motor are provided and in which the motor has a high-resistance secondary. Fig. 2 is a diagram indicating the torque in terms of speed in motors having low magnetic leakage and comparatively high secondary resistance, and Fig. 3 is a diagram indicating the torque in terms of speed in a motor of usual construction in which there is a greater magnetic leakage between the primary and secondary and in which the secondary has a comparatively low resistance.

Referring more particularly to the drawings, 1 is a two-phase induction-motor the primary member of which is supplied with energy from the secondaries of two transformers 2 and 3, the primaries of such transformers being supplied from a two-phase generator 4. Each of the transformers 2 and 3 is shown as provided with a divided secondary having branching conductors which terminate in a series of contact-points 5. A contact bar or strip 6 is located parallel to each series of contact-points 5, a movable contact device 7 being so located as to make electrical connection between any contact-point of the series and the adjacent strip 6. It will be readily understood that by this or any equivalent means I am enabled to include a greater or less portion of the length of the secondary coil in circuit, whereby the electromotive force applied to the primary winding of the motor 1 may be varied in order to secure variable speed with a maximum starting torque.

8 are ordinary current-indicating instruments connected with the circuit supplying the primaries of the transformers 2 and 3.

Figure 3:
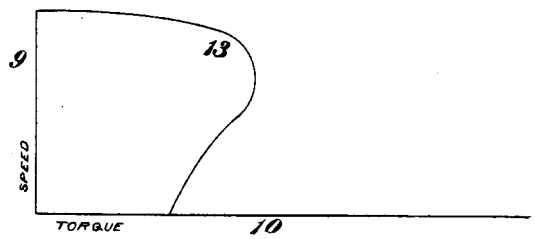

In each of Figs. 2 and 3 speed is indicated on the line 9 and torque on the line 10. It will be observed from the curved full line 12 of Fig. 2, which indicates the torque in terms of speed, that the maximum torque is secured at zero speed, which is a desirable condition in motors employed for moving loads frequent starting and stopping of which are necessary. The broken line 12 indicates the torque in terms of speed at a reduced voltage. This diagram indicates the conditions in motors in which the magnetic leakage is small and the secondary resistance comparatively high. As indicated in Fig. 3, the torque in terms of speed represented by the line 13 shows that the torque at zero speed is only a fraction of that which is exerted when the motor is running at a comparatively high speed near synchronism. This reduction in torque at low speed is not of material consequence in motors which are employed for work requiring an approximately uniform speed; but it is obviously not suitable for use where frequent stopping and starting are necessary, and particularly where the motors must necessarily be started under considerable load.

I claim as my invention—

1. In a polyphase alternating-current electric motor, the combination with the primary member, of a secondary member provided with a comparatively high resistance winding directly short-circuited on itself, and means for varying the electromotive force applied to the primary member whereby the speed of the motor is varied.

2. A variable-speed, non-synchronous motor having a comparatively large secondary resistance and a small degree of magnetic leakage between its primary and secondary members, in combination with means for varying the electromotive force applied to its primary member, whereby the speed of the motor is varied.

3. The combination with an induction-motor having small magnetic leakage and a high-resistance secondary circuit, of means for varying the speed of said motor consisting of a transformer or transformers for supplying current to the primary winding of the motor and means for varying the relation between the primary and secondary coils, and thereby varying the electromotive force supplied by the secondary.

4. The combination with a polyphase induction-motor having a high-resistance secondary winding directly short-circuited on itself, of transformers for supplying current to the primary member thereof, and means for varying the active lengths of the secondaries of such transformers whereby the electromotive force applied to the primary of the motor is varied, in order to vary the speed of the motor.

In testimony whereof I have hereunto subscribed my name this 7th day of March, A. D. 1896.

BENJ. G. LAMME.

Witnesses:
WESLEY G. CARR,
HUBERT C. TENER.